United States Patent
Pinkhassik et al.

(10) Patent No.: US 7,678,838 B2
(45) Date of Patent: Mar. 16, 2010

(54) NANOTHIN POLYMER FILMS WITH SELECTIVE PORES AND METHOD OF USE THEREOF

(75) Inventors: Evgueni Pinkhassik, Memphis, TN (US); Delia Cesara Danila, Houston, TX (US); Larry Todd Banner, Cordova, TN (US)

(73) Assignee: University of Memphis Research Foundation, Memphis, TN (US)

( * ) Notice: Subject to any disclaimer, the term of this patent is extended or adjusted under 35 U.S.C. 154(b) by 0 days.

(21) Appl. No.: 11/888,739

(22) Filed: Aug. 2, 2007

(65) Prior Publication Data

US 2008/0286549 A1   Nov. 20, 2008

Related U.S. Application Data

(60) Provisional application No. 60/821,450, filed on Aug. 4, 2006.

(51) Int. Cl.
*C08J 9/00* (2006.01)

(52) U.S. Cl. .......................................... 521/50; 264/41

(58) Field of Classification Search .................. 521/56, 521/50

See application file for complete search history.

(56) References Cited

U.S. PATENT DOCUMENTS

| | | | |
|---|---|---|---|
| 5,403,902 A * | 4/1995 | Heilmann et al. | 526/260 |
| 5,549,931 A | 8/1996 | Dattatraya et al. | |
| 5,773,581 A | 6/1998 | Camble et al. | |
| 6,217,901 B1 * | 4/2001 | Perrott et al. | 424/450 |
| 6,492,283 B2 | 12/2002 | Raaijmakers et al. | |
| 6,617,173 B1 | 9/2003 | Sneh | |
| 6,905,547 B1 | 6/2005 | Londergan et al. | |
| 6,967,154 B2 | 11/2005 | Meng et al. | |
| 7,045,430 B2 | 5/2006 | Ahn et al. | |
| 2001/0016273 A1 | 8/2001 | Narasimhan et al. | |
| 2001/0023250 A1 | 9/2001 | Spada et al. | |

FOREIGN PATENT DOCUMENTS

WO   WO-2004/007597 A1 *   1/2004

OTHER PUBLICATIONS

Haupt, Karsten; Mosbach, Klaus; Molecularly Imprinted Polymers and Their Use in Biomimetic Sensors; Chem. Rev.; Jun. 2000; 100; 2495-2504.

(Continued)

*Primary Examiner*—Mark Eashoo
*Assistant Examiner*—Peter F Godenschwager
(74) *Attorney, Agent, or Firm*—Wyatt, Tarrant & Combs, LLP

(57) ABSTRACT

A method of preparing nanothin polymer films having uniform and selectively sized pores utilizing pore forming templates. Lipids and pore forming templates are dissolved into a first solution. The solvent is removed thereby creating a lipid bilayer with pore forming templates dispersed throughout. The bilayer is hydrated and monomers and crosslinkers are added to create a second solution. A nanothin film with pore forming templates is created through polymerization of said second solution. The pore forming templates are dissolved into a third solution by addition of a chemical in which the pore forming template is soluble, but the lipid bilayer is insoluble. This third solution is separated from the mixture leaving a nanothin polymer film with pores of a uniform thickness and surface area. In summary, the guided assembly method presented here suggests a new general strategy for the fabrication of nanothin materials with controlled permeability, which provides improvements over the currently existing technology.

10 Claims, 7 Drawing Sheets

U.S. PATENT DOCUMENTS

| | | |
|---|---|---|
| 2003/0091609 A1 | 5/2003 | Hendriks |
| 2003/0138608 A1 | 7/2003 | Landry-Coltrain et al. |
| 2003/0157732 A1 | 8/2003 | Baker et al. |
| 2004/0058135 A1 | 3/2004 | Patel et al. |
| 2004/0121139 A1* | 6/2004 | Yim et al. ............... 428/304.4 |
| 2004/0202789 A1 | 10/2004 | Patil et al. |
| 2005/0175661 A1 | 8/2005 | Hunter et al. |
| 2006/0041077 A1 | 2/2006 | Kriesel et al. |

OTHER PUBLICATIONS

Marty, Jean Daniel; Mauzac, Monique; Molecular Imprinting: State of the Art and Perspectives; Adv. Polym. Sci.; Oct. 19, 2006; 172; 1-35.

Li, Wuke; Li, Songjun; Molecular Imprinting: A Versatile Tool for Separation, Sensors and Catalysis; Adv. Polym. Sci.; 2007; 206; 191-210.

Gorteau, Virginie; Bollot, Guillaume; Mareda, Jiri; Pasini, Dario; Tran, Duy-Hien; Lazar, Adina N., Coleman, Anthony W.; Sakai, Naomi; Matile, Stefan; Synthetic multifunctional pores that open and close in response to chemical stimulation; Bioorganic & Medicinal Chemistry 13; Jun. 2005; 5171-5180.

Bayley, H.; Martin, C.R. Resistive-Pulse Sensing—From Microbes to Molecules; Chem. Rev.; Jun. 21, 2000, 100, 2575-2594.

Kasianowicz, J.J.; Brandin, E.; Branton, D.; Deamer, D.W. Char. of Ind. Polynucleotide Molecules Using a Membrane Channel; Proc. Natl. Acad. Sci. U.S.A.; Nov. 1996, 93, 13770-13773.

Alper, J. From the Bioweapons Trenches, New Tools for Battling Microbes; Science; Jun. 11, 1999, 284, 1754-1755.

Vriezema, D.M.; Aragones, M.C.; Elemans, J.A.A.W.; Cornelissen, J.J.L.M.; Rowan, A.E.; Nolte, R.J.M. Self-Assembled Nanoreactors; Chem. Rev. Mar. 1, 2005, 105, 1445-1489.

Nardin, C.; Thoeni, S.; Widmer, J.; Winterhalter, M.; Meier, W. Nanoreactors based on (polymerized) ABA-triblock copolymer vesicles; Chem. Commun. The Royal Society of Chemistry 2000, 1433-1434.

Lin, Z., Kim, D. H., Wu, X., Boosahda, L., Stone, D., Larose, L. & Russell, T. P. A Rapid Route to Arrays of Nanostructures in Thin Films; Advanced Materials Oct. 2, 2002, 14, 1373-1376.

Jeong, U., Ryu, D. Y., Kim, J. K., Kim, D. H., Wu, X. & Russell, T. P. Precise Control of Nanopore Size in Thin Film Using Mixtures of Asymmetric Block Copolymer and Homopolymer; Macromolecules Dec. 2, 2003, 36, 10126-10129.

Wei, Y.; Qiu, K.-Y. A Novel Nonsurfactant Route to Nanoporous Materials and Its Biological Applications; Series on Chemical Engineering, Nanoporous Materials; 2004, vol. 4; Ch. 28; 873-892; Imperial College Press.

Desai, T.A.; Hansford, D.J.; Kulinsky, L.; Nashat, A.H.; Rasi, G.; Tu, J.; Wang, Y.; Zhang, M.; Ferrari, M.; Nanoporous anit-fouling silicon mebranes for biosensor applications; Biosensors & Bioelectronics 2000, 15, 454-462.

Poulain, N.; Nakache, E.; Pina, A.; Levesque, G.J. Nanoparticles from Vesicle Polymerization: Characterization and Kinetic Study; Journal of Polymer Science 1996, 34, 729-737.

Hotz, J.; Meier, W. Vesicle-Templated Polymer Hollow Spheres; Langmuir Feb. 3, 1998, 14, 1031-1036.

Nardin, C. Hirt, T.; Leukel, J.; Meier, W. Polymerized ABA Triblock Copolymer Vesicles; Langmuir, Nov. 20, 1999, 16, 1035-1041.

Kurja, J.; Noelte, R.J.M.; Maxwell, I,A,; German, A,I, Free Radical Polymerization of Styrene in Dioctadecyldimethylammonium Bromide Vesicles; Polymer, 1993, 34, 2045-2049.

McKelvey, C.A.; Kaler, E.W.; Zasadzinski, J.A.; Coldren; Jung, H.T. Templating Hollow Polymeric Spheres from Catanionic Equilibrium Vesicles: Synthesis and Characterization; Langmuir, Sep. 28, 2000, 16, 8285-8290.

Jung, M.; Hubert, D.H.W.; Bomans, P.H.H.; Frederik, P.M.; Meuldijk, J.; Van Herk, A.M.; Fischer, H. German, A.I. New Vesicle-Polymer Hybrid: the Parachute Architecture; Langmuir 1997, 13, 6877-6880.

McIntosh, T. J., Simon, S. A. & MacDonald, R. C. The Organization of n-Alkanes in Lipid Bilayers; Biochimica et Biophysica Acta 1980, 597, 445-463.

McDaniel, R. V., Simon, S. A., McIntosh, T. J. & Borovyagin, V. Interaction of Benzene with Bilayers. Thermal and Structural Studies; Biochemistry 1982, 21, 4116-4126.

Kitiyanan, B., O'Haver, J. H., Harwell, J. H. & Osuwan, S. Absolubilization of Styrene and Isoprene in Cetyltrimethylammonium Bromide Admicelle on Precipitated Silica; Langmuir 1996, 12, 2162-2168.

Well, A., Dechenaux, E. The Spin-Coating Mechanism Related to Polymer Solution Properties; Polymer Engineering and Science, Mid-Aug. 1988, 28, 15, 945-948.

Dyer, D.J., Feng, J., Schmidt, R., Wong, V.N., Zhoa, T., Yagci, Y. Photoinduced Plymerization from Dimethylamino-Terminated Self-Assembled Monolayers on Gold; Macromolecules 2004, 37, 7072-7074.

* cited by examiner

NANOTHIN POLYMER FILMS WITH SELECTIVE PORES AND METHOD OF USE THEREOF

This application claims the benefit of U.S. Provisional Patent Application No. 60/821,450, filed Aug. 4, 2006, entitled "Nanothin Polymer Films with Selective Pores and Method of Use Thereof," which is hereby incorporated by reference in its entirety.

STATEMENT REGARDING FEDERALLY SPONSORED RESEARCH OR DEVELOPMENT

This invention was made, in part, with federal grant money under NSF grant CHE-0349315. The United States Government has certain rights in this invention.

REFERENCE TO A MICROFICHE APPENDIX

Not applicable

BACKGROUND OF THE INVENTION

One of the most pressing challenges in the design of soft nanomaterials is the fabrication of selective molecular size nanopores in nanothin membranes. Selective nanopores can be extremely useful in such applications as DNA sequencing, fabrication of nanobioreactors, nanoelectronics, and advanced drug delivery devices. (Bayley, H.; Martin, C. R. Resistive-Pulse Sensing—From Microbes to Molecules. Chem. Rev. 2000, 100, 2575-2594; Kasianowicz, J. J.; Brandin, E.; Branton, D.; Deamer, D. W. *Proc. Natl. Acad. Sci. U.S.A.* 1996, 93, 13770-13773; Alper, J. *Science* 1999, 284, 1754-1754; Vriezema, D. M.; Aragones, M. C.; Elemans, J. A. A. W.; Cornelissen, J. J. L. M.; Rowan, A. E.; Nolte, R. J. M. *Self-Assembled Nanoreactors Chem. Rev.* 2005, 105, 1445-1489; Nardin, C.; Thoeni, S.; Widmer, J.; Winterhalter, M.; Meier, W. *Chem. Commun.* 2000, 1433; Lin, Z., Kim, D. H., Wu, X., Boosahda, L., Stone, D., LaRose, L. & Russell, T. P. *A rapid route to arrays of nanostructures in thin films. Advanced Materials* 2002, 14, 1373-1376; Jeong, U., Ryu, D. Y., Kim, J. K., Kim, D. H., Wu, X. & Russell, T. P. *Precise control of nanopore size in thin film using mixtures of a symmetric block copolymer and homopolymer. Macromolecules* 2003, 36, 10126-10129; Wei, Y.; Qiu, K.-Y. *Ser. Chem. Eng.* 2004, 4, 873-892; Desai, T. A.; Hansford, D. J.; Kulinsky, L.; Nashat, A. H.; Rasi, G.; Tu, J.; Wang, Y.; Zhang, M.; Ferrari, M. *Nanopore technology for biomedical applications Biomed. Microdevices* 1999, 2, 11-40; each of which is hereby incorporated by reference in its entirety.) Currently existing nanothin films having selective pores do not have the advantages of the present invention. The present invention discloses a method for the fabrication of nanothin materials with controlled size nanopores and demonstrates size selective permeability with the size probe retention assay.

SUMMARY OF INVENTION

The present invention discloses a method for the assembly of porous nanothin materials, specifically the formation of a nanothin crosslinked polymer film with embedded pore-forming templates in the organized medium of a self-assembled non-covalent scaffold, as best seen in FIG. 1. The method includes the steps of loading hydrophobic monomers, crosslinkers, and hydrophobic pore-forming templates into hydrophobic interior of self-assembled bilayers (FIG. 1A), permitting lateral propagation of polymerization while the bilayer prohibits material growth orthogonal to their plane ensuring uniform thickness in the nanometer scale, and removing the pore-forming templates and the scaffold from the crosslinked nanothin polymer film with embedded pore-forming templates (FIGS. 1B and 1C). This method builds upon previously reported surfactant-templated synthesis of polymer nanocapsules but introduces a method for creation and size control of nanopores. (Poulain, N.; Nakache, E.; Pina, A.; Levesque, G. J. *Nanoparticles from Vesicle Polymerizatio: Characterization and Kinetic Study J Polym. Sci.* 1996, 34, 729-737; Hotz, J.; Meier, W. *Vesicle-templated Polymer Hollow Spheres Langmuir* 1998, 14, 1031-1036; Nardin, C. Hirt, T.; Leukel, J.; Meier, W. *Polymerized ABA Triblock Copolymer Vesicles Langmuir,* 2000, 16, 1035-1041; Kurja, J.; Noelte, R. J. M.; Maxwell, I. A.; German, A. I. *Free Radical Polymerization of Styrene in Dioctadecyldimethylammonium Bromide Vesicles. Polymer,* 1993, 34, 2045; McKelvey, C. A.; Kaler, E. W.; Zasadzinski, J. A.; Coldren, Jung, H. T. *Templating Hollow Polymeric Spheres from Catanionic Equilibrium Vesicles: Synthesis and Characterization Langmuir,* 2000, 16, 8285-8290; Jung, M.; Huber, D. H. W.; Bomans, P. H. H.; Frederic, P. M.; Meuldijk, J.; van Herk, A. M.; Fischer, H. German, A. I. *New Vesicle-Polymer Hybrid: the Parachute Architecture. Langmuir* 1997, 13, 6877-6880; each of which is hereby incorporated by reference in its entirety.)

between the sizes of 1.1 and 1.6 nm). The blue dye produced a blue color upon visual inspection.

PREFERRED EMBODIMENTS OF THE INVENTION

Figure 1:
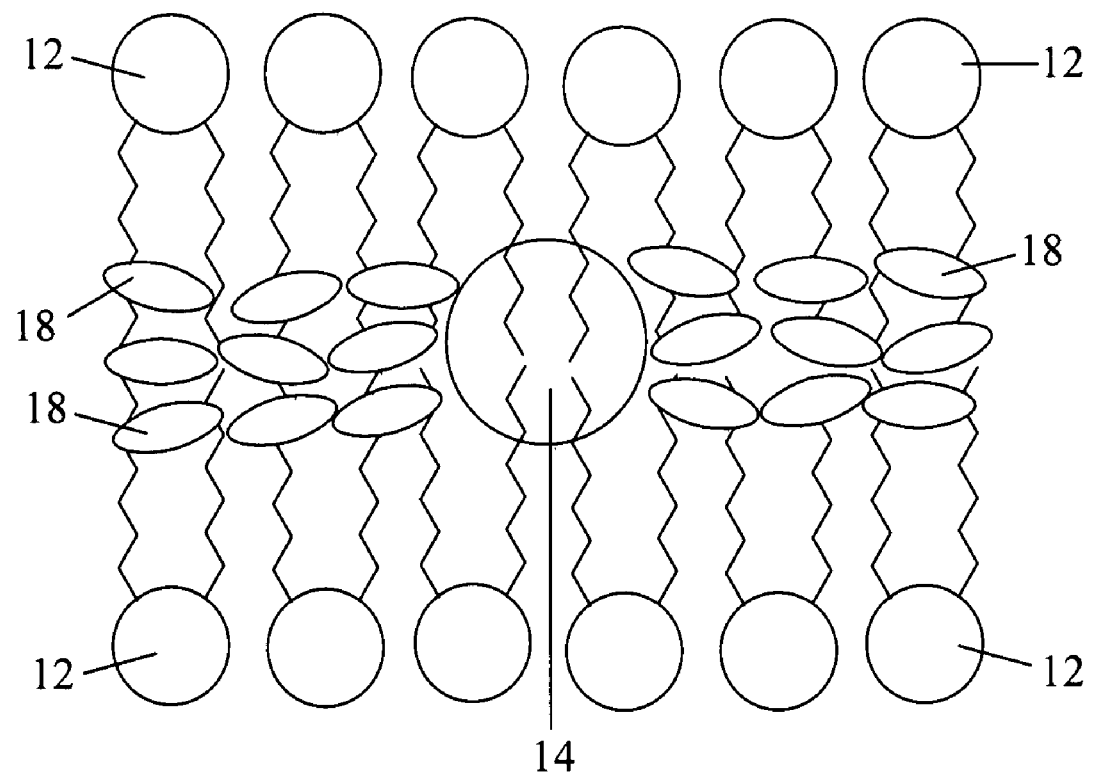
FIG. 1 is a schematic diagram showing a self assembled phospholipid bilayer containing hydrophobic monomers and pore forming templates.
Figure 2:
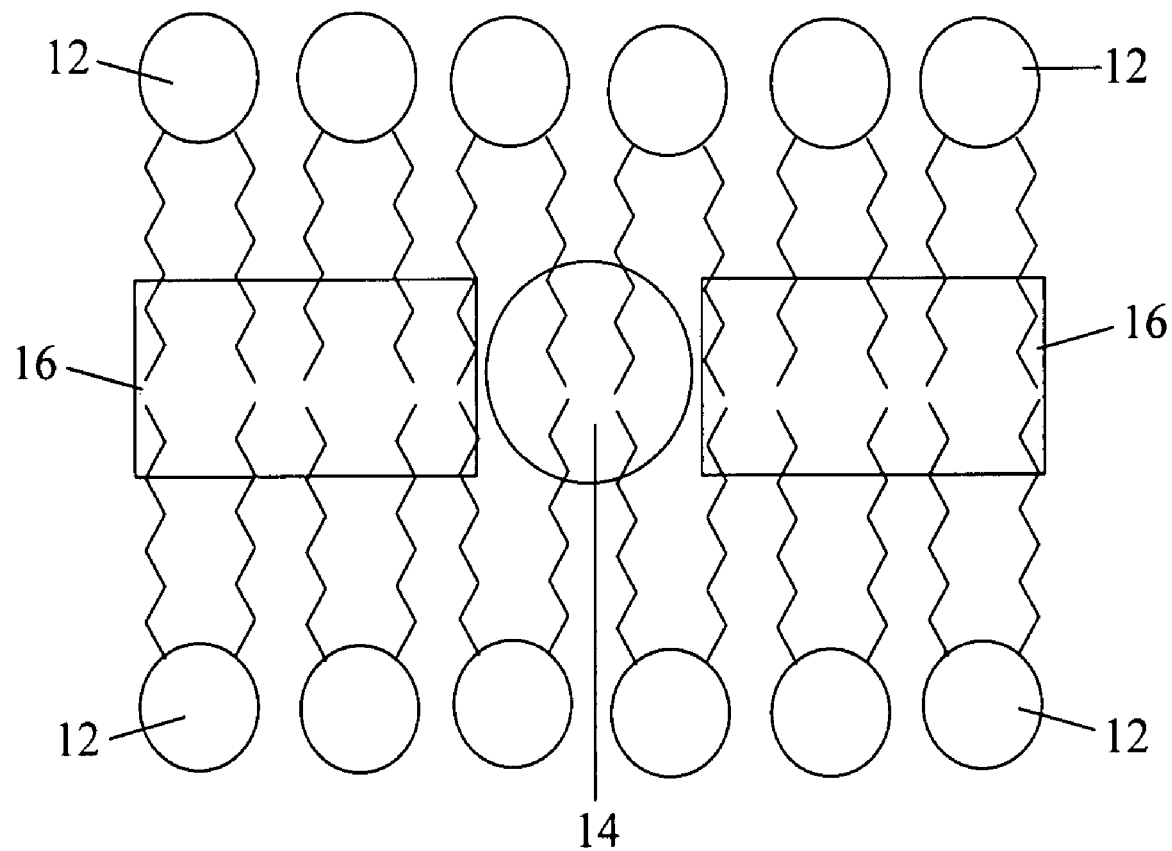
FIG. 2 is a schematic diagram showing that polymerization produces a nanothin film with embedded pore forming templates in the interior of the phospholipid bilayer.
Figure 3:
FIG. 3 is a schematic diagram showing that removal of phospholipids by the detergent treatment yields a nanothin film with uniformly sized pores. Pore forming templates are removed either by solvent extraction or chemical degradation.

The present invention discloses a method of preparing nanothin polymers having uniform and selectively sized pores. Lipids 12 and pore forming templates 14 are dissolved into a first solution. Pore forming templates 14 are inert and do not participate in polymerization. They are hydrophobic molecules which are chemically degradable. Molecules with these characteristics are selected based on their size to create a specific size pore. The first solution is dried thereby creating a lipid film with pore forming templates 14 dispersed throughout, as best seen in FIG. 1. A second solution is created comprising uniformly sized liposomes containing pore forming templates 14 and monomers 18. A nanothin film comprising a lipid bilayer with a hydrophobic, interior polymer layer with pore forming templates 14 dispersed throughout is created through polymerization of said second solution, as best seen in FIG. 2. The pore forming templates 14 are dissolved into a third solution by addition of a chemical in which the pore forming templates 14 and lipid bilayer are soluble, but the polymer film 16 is insoluble. This third solution is separated from the mixture leaving a nanothin polymer film 16 with pores of a uniform thickness and surface area, as best seen in FIG. 3.

In certain embodiments of the present invention, a 1:1 mixture of styrene and divinylbenzene was used to load in the bilayers. To determine the mole ratio of monomers 18 to phospholipids 12, the excess monomers 18 were first microseparated from liposome solubilized monomers 18. Monomers 18 loaded in the bilayer interior were quantified by gas chromatography analysis following solvent extraction.

Solvent extraction of the monomers 18 was performed as follows: an aliquot of an aqueous liposome solution (typically, 50 uL) was diluted to 1 ml in water and vigorously mixed with 1 mL of hexane containing 0.04% of toluene as an internal standard for gas chromatography. The layers were allowed to separate, and the hexane layer was analyzed by gas chromatography using poly(5% diphenyl/95% dimethylsiloxane) capillary column (0.53 mm×30 m) and helium as a carrier gas (flow rate 3 mL/min). Temperature was held at 80° C. for two minutes following the sample injection and then was ramped to 250° C. at 10° C. per minute.

Monomers 18 and the internal standard readily separated with no overlap. Quantities of monomers 18 were determined by the integration of corresponding peaks against an internal standard (toluene) and using a calibration curve, which was obtained from gas chromatography analyses of multiple solutions of monomers in hexane. The calibration curve was averaged from at least three separate preparations of monomer solutions, and the extraction method was evaluated for reproducibility and validated by spectroscopic measurements such as ultraviolet spectroscopy. The mole ratio of monomers 18 to lipids 12 was approximately 0.9. This correlates well with previously reported maximum mole ratios of about 0.9 for alkanes, 0.9 for benzene in multilamellar liposomes, and 0.85 for styrene in surfactant admicelles. (McIntosh, T. J., Simon, S. A. & MacDonald, R. C. *The organization of n-alkanes in lipid bilayers. Biochimica et Biophysica Acta* 1980, 597, 445-463; McDaniel, R. V., Simon, S. A., McIntosh, T. J. & Borovyagin, V. *Interaction of benzene with bilayers. Thermal and structural studies. Biochemistry* 1982, 21, 4116-4126; Kitiyanan, B., O'Haver, J. H., Harwell, J. H. & Osuwan, S. *Absolubilization of styrene and isoprene in cetyltrimethylammonium bromide admicelle on precipitated silica. Langmuir* 1996, 12, 2162-2168; each of which is hereby incorporated by reference in its entirety.)

The polymerization was quantitative as evidenced by the absence of unreacted monomers 18 determined by gas chromatography following the method described above. In our polymer capsules, an average of 1.8 monomer 18 and crosslinker 20 molecules were located between a pair of lipids 12 in a bilayer, which results in a polymer film 16 with the thickness of 1-1.5 nm and surface area of approximately 4,000 $m^2$ per gram of material.

In certain embodiments, glucose pentaesters, widely commercially available, may be selected as pore forming templates 14. Specifically, glucose pentaacetate and glucose pentabenzoate, the larger of the two, which are lipophilic and reasonably symmetric, were used as pore forming templates 14. The important features of these pore forming templates 14 is that they are inert molecules, chemically degradable or dissolvable, hydrophobic, and sized as needed to create the desired pore size. Accordingly, upon acid or base catalyzed hydrolysis they form small hydrophilic molecules of glucose and either acetic or benzoic acid that can easily diffuse from the pore into the bulk of aqueous solution. In our experiments, to accomplish the hydrolysis, polymer nanocapsules were typically treated with an aqueous solution of sodium hydroxide (0.1M) and allowed to react at ambient temperature for 15-30 minutes.

Figure 4:
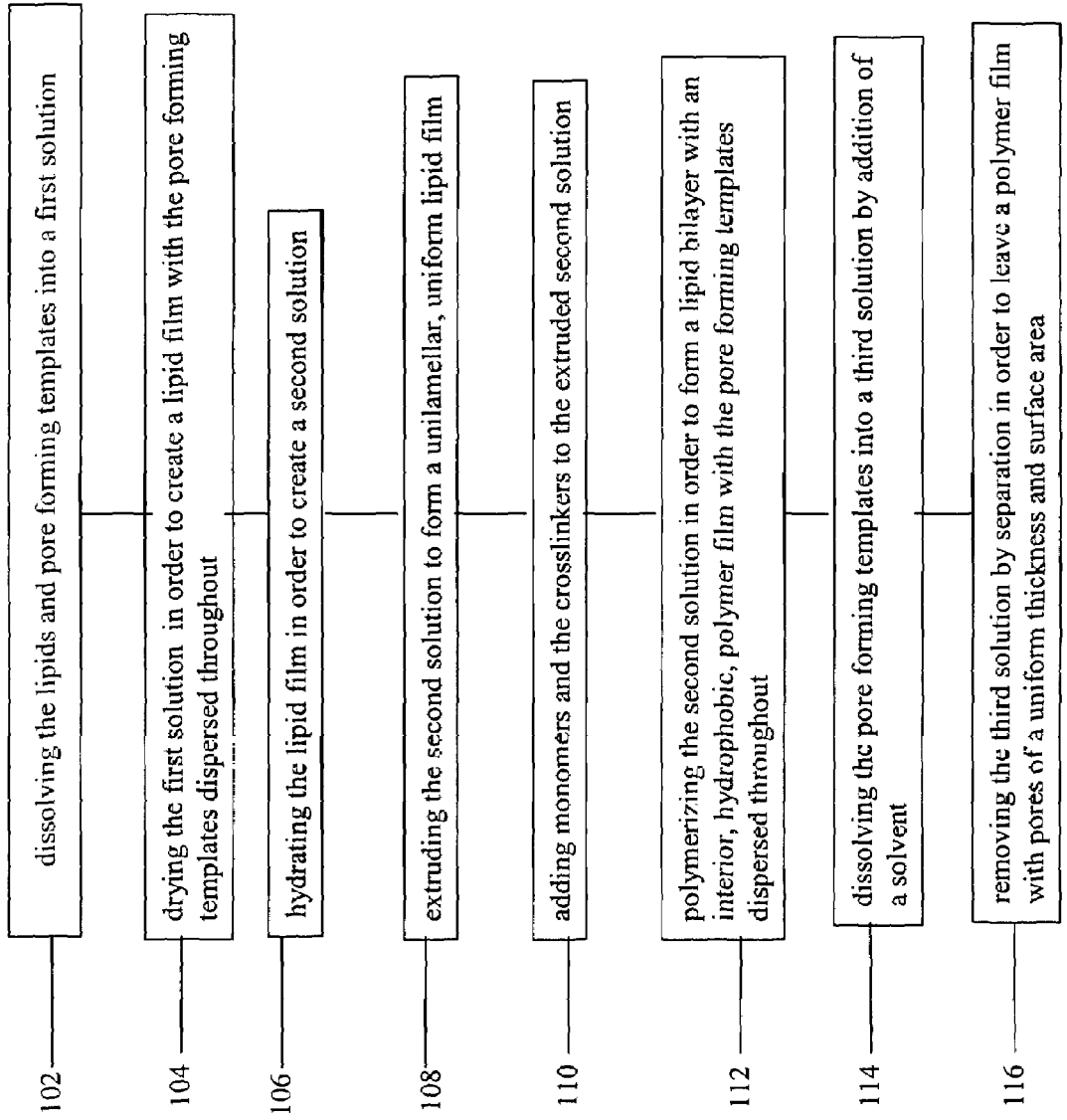
FIG. 4 is a flow chart showing the steps of an embodiment of the method of preparing a polymer film having uniformly sized pores.

Referring now to FIG. 4, there is shown a flow chart of an embodiment of the method of producing a polymer film with pores. In the embodiment shown, after providing lipids 12 and pore forming templates 14, there is dissolving 102 the lipid 12 and the pore forming template 14 into a first solution, drying 104 the first solution in order to create a lipid film 16 with the pore forming templates 14 dispersed throughout, hydrating 106 the lipid film 16 in order to create a second solution, extruding 108 the second solution to form a unilamellar, uniform lipid film, adding 110 the monomer 18 and the crosslinker 20 to the extruded second solution, polymerizing 112 the second solution in order to form a lipid bilayer with an interior, hydrophobic, polymer film 16 with the pore forming templates 14 dispersed throughout, dissolving 114 the pore forming templates 14 into a third solution by addition of a solvent, and removing 116 the third solution by separation in order to leave a polymer film 16 with pores of a uniform thickness and surface area.

Figure 5:
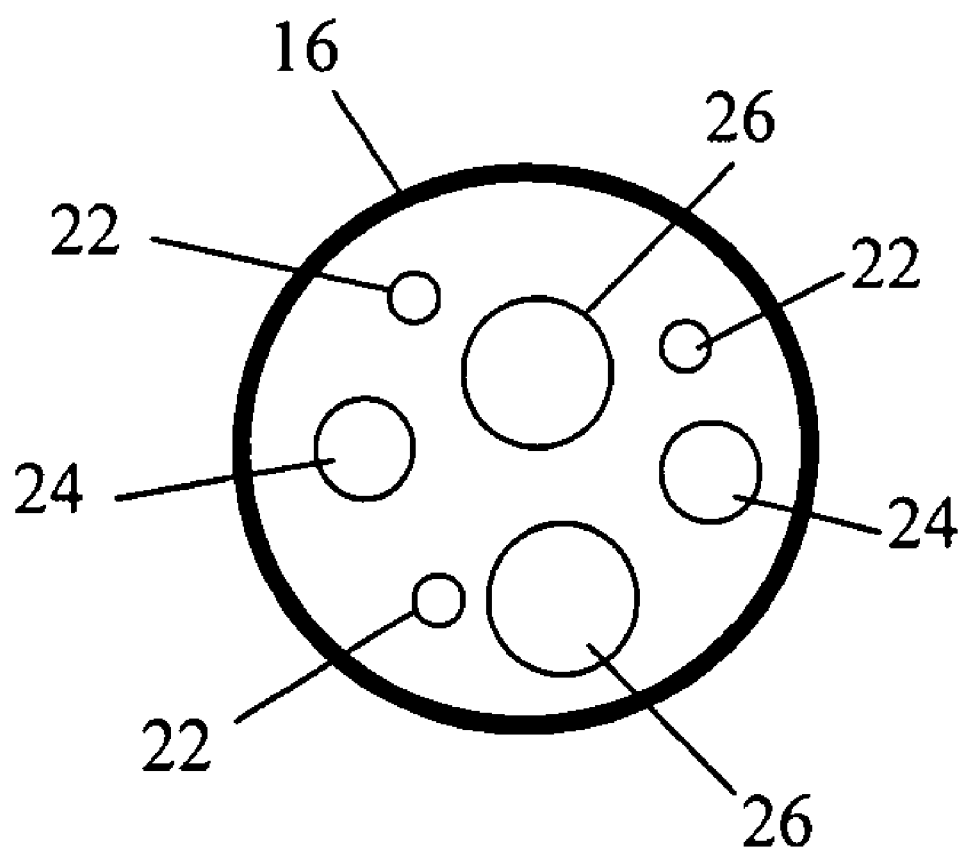
FIG. 5 is a schematic drawing showing a liposome having no pore forming templates that was loaded with the three colored probes described herein. Since no pores were formed, all three of the probes were not able to escape. The combination of the probes results in a brown color upon visual inspection.
Figure 6:
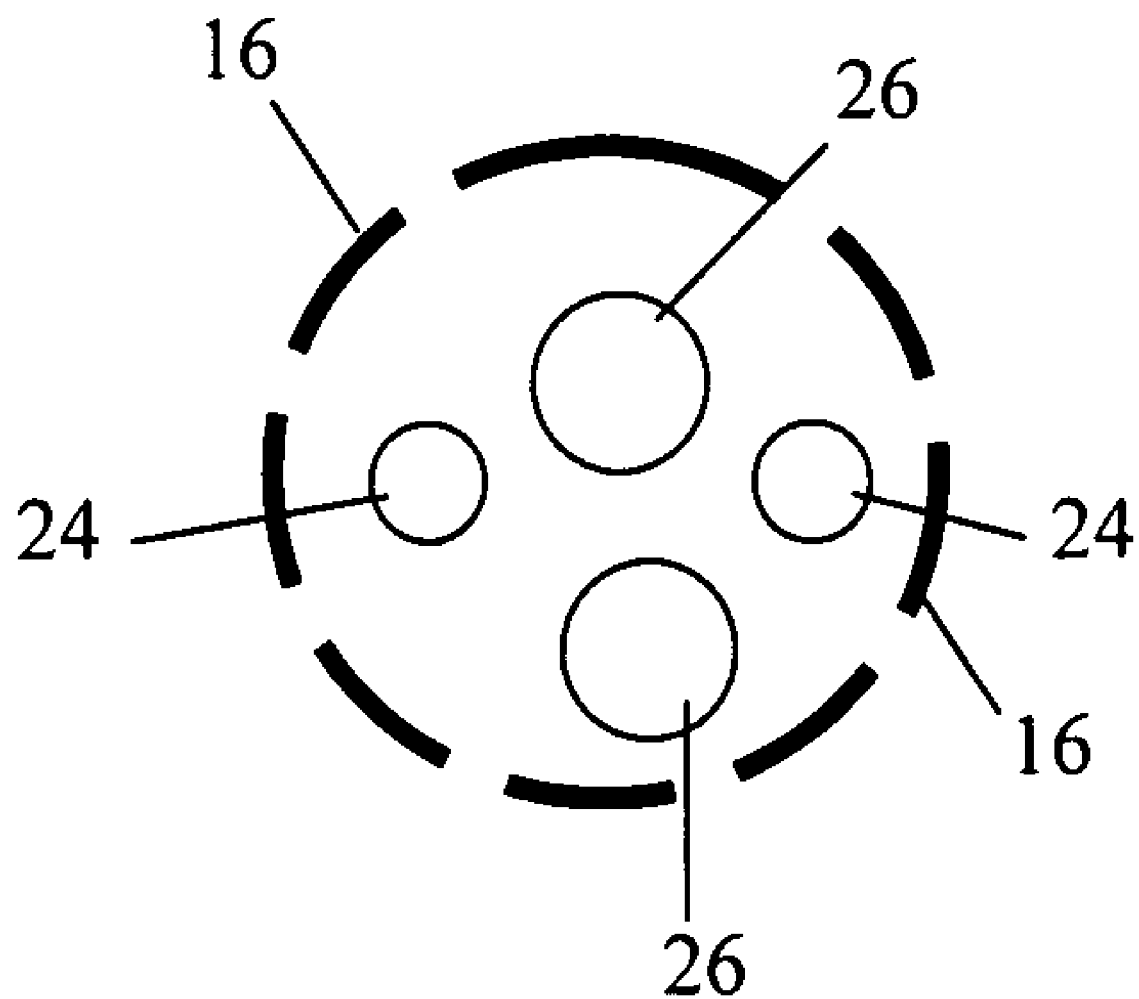
FIG. 6 is a schematic drawing showing a liposome having glucose pentaacetate as pore forming templates. The liposome was loaded with the three colored probes described herein. Since uniformly sized pores were formed, they were large enough to release small yellow dye but small enough to retain medium size red and large blue dyes (i.e between sizes of 0.6 and 1.1 nm). The combination of red and blue dyes produces the secondary purple color upon visual inspection.
Figure 7:
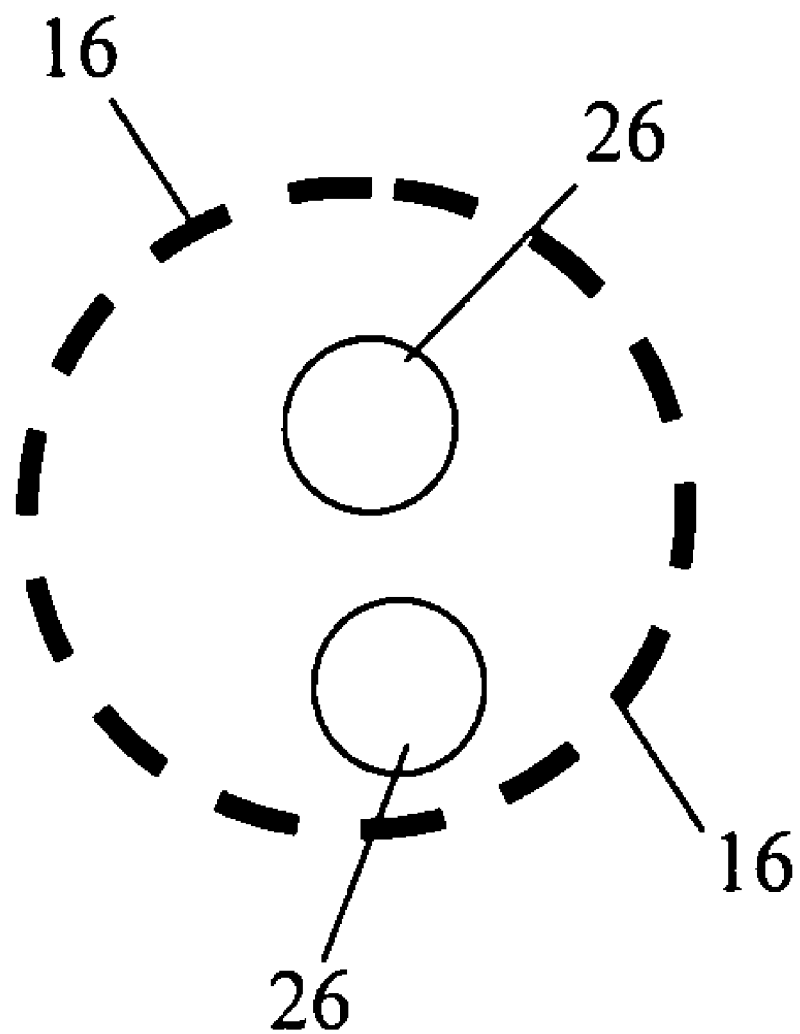
FIG. 7 is a schematic drawing showing a liposome having glucose pentabenzoate as pore forming templates. The liposome was loaded with the three colored probes described herein. Since uniformly sized pores were formed, they were large enough to release small yellow and medium size red dyes but small enough to retain the large blue dye (i.e.

In a certain embodiment, liposomes were created with an encapsulated testing mixture containing hydrophilic dyes of different sizes and monomers 18 and crosslinkers 20 loaded into bilayer membrane interior. One batch of liposomes contained glucose pentaacetate in the bilayer, the other contained glucose pentabenzoate. The control sample did not have any pore-forming templates 14 in the bilayer. Through polymerization as described in Example One, a nanothin film 16 with embedded pore-forming templates 14 was formed in all samples except for the control sample. The lipids 12 were removed by detergent treatment as described in Example Two and a nanothin film 16 with uniform nanopores was formed. Next, the capsules were separated from released dyes by the size exclusion chromatography as described in Example Three. Referring now to FIG. 5, the control sample retained the mixture of all three colored size probes (0.6 nm yellow, 1.1 nm red, and 1.6 nm blue) and was colored brown. Relative to each other, the 0.6 nm yellow probe is small, the 1.1 nm red probe is medium, and the 1.6 nm blue probe is large. As shown in FIG. 6, the sample containing glucose pentaacetate as pore forming template released 0.6 nm yellow size probe and retained 1.1 nm red and 1.6 nm blue size probes as evidenced by its purple color. As shown in FIG. 7, the sample containing glucose pentabenzoate as pore forming templates released 0.6 nm yellow and 1.1 nm red size probes and retained 1.6 nm blue size probes resulting in blue color of capsules.

It is known in the art that direct imaging of sub-nanometer size pores in soft nanothin materials presents significant challenges. Imaging usually covers a small fraction of the material surface, and may provide limited information related to the material performance caused by structural defects. Accordingly, in the design of functional nanomaterials, functional characterization provides direct and relevant information. As discussed above, a colored size probe retention assay was used to evaluate the permeability of newly prepared nanoporous materials. The assay is based on subtraction of colors of released dyes from the color of the testing mixture containing dyes of different sizes and colors. In this method, a capsule is formed with a mixture of three entrapped colored size probes, small, medium, and large, and then the lipid scaffold and pore forming templates are removed opening the pores and allowing dyes smaller than the pore size to escape. The capsules are separated from escaped dyes by the size exclusion chromatography. The quantities of retained probes can be determined by the UV-vis spectroscopy. For simplicity of visual observation, we selected three groups of primary colors, 0.6 nm yellow, 1.1 nm red and 1.6 nm blue. By mixing these colors, the ternary color of brown results for capsules retaining all three dyes. If the pores are large enough to release small yellow dye but small enough to retain medium size red and large blue dyes (i.e between sizes of 0.6 and 1.1 nm), the combination of red and blue dyes produces the secondary purple color of capsules. When the pores are large enough to release small yellow and medium size red dyes but small enough to retain the large blue dye (i.e. between the sizes of 1.1 and 1.6 nm), the capsules are colored blue. Separation of fractions containing polymer capsules with pure brown, purple, and blue colors suggested complete release of colored size probes smaller than the pore size and retention of probes larger than the pore size. In addition to visual observation, quantities of retained probes were determined by UV-vis spectroscopy separately for each probe to eliminate spectral interference from other probes. These measurements showed complete release of probes smaller than the pore size and nearly quantitative retention of probes larger than the pore size.

In certain embodiments of the present invention, yellow colored methyl orange 22 (MW 328 g/mol, smallest cross-section 0.6 nm), red colored Procion Red 24 (MW 615 g/mol, smallest cross-section 1.1 nm), and blue-colored Reactive Blue 2 coupled to β-cyclodextrin 26 (MW 1940 g/mol, smallest cross-section 1.6 nm), were selected as the small, medium, and large dyes, respectively. Each compound is widely commercially available. The dye-cyclodextrin conjugate was prepared by the following method. A freshly prepared solution of dye (50 mg in 5 ml of distilled water) was added to a solution of β-cyclodextrin (50 mg in 5 ml of distilled water). After 5 minutes, 200 mg of NaCl was added so that the final concentration was 2%. Thirty minutes later, $Na_2CO_3$ was added to give a final concentration of 0.1% (10 mg). The reaction mixture was stirred overnight.

The dye-cyclodextrin conjugate was purified by size exclusion chromatography using small Sephadex G-25 or Sephadex G-10 columns. The Sephadex columns were prepared in a standard disposable 3 ml syringe. The Sephadex was mixed with distilled water and poured carefully in the column so that air bubbles were not formed. The Sephadex was allowed to settle down while keeping it hydrated at all times. Batches of reaction mixture of 0.5 mL were separated on the column. Larger molecules of dye-cyclodextrin conjugate elute first followed by the unattached dye. To ensure that all unattached dye and inorganic salts were separated, two consecutive separations were performed for each sample.

Space-filling models suggest that the size of the small pore forming template 14 glucose pentaacetate is between sizes of small (0.6 nm) and medium (1.1 nm) dyes, and the large template 14 glucose pentabenzoate is between medium (1.1) and large (1.6) dyes. Because the size difference in these materials is small, the chosen dyes present a sensitive probe for the pore size differences.

Transmission electron micrographs of capsules show structures of nearly circular shape with size range of 70-130 nm. They reveal no effect of pore forming templates 14 on the capsule size. This supports expectations that the pore forming templates 14 would not compromise the structural integrity of the nanocapsules. Control samples analyzed with transmission electron microscopy included the following: 1) liposomes in water, 2) detergent Triton X-100 in water, 3) liposomes mixed with Triton X-100, and 4) styrene/divinylbenzene 1:1 mixture polymerized in water in the absence of liposomes. Control sample 1 containing liposomes in water show nearly circular structures 70-130 nm in size, identical to the structures observed in samples containing polymer capsules. Control samples 2-4 described above showed no identifiable structures in 40-200 nm range, as expected since Triton X-100 does not form micelles larger than 40 nm, liposomes are completely dissolved when mixed with Triton X-100, and polymerized monomers form structures larger than 1 μm. This shows conclusively that polymer material is indeed formed in the bilayer interior.

The selectivity exhibited by these materials is remarkable, and the data suggest that this crosslinked nanothin material retains its structure well being only one or two molecules thick. There is a wide range of pore sizes can be fabricated following the same guided assembly strategy. These nanothin polymer films with uniform pore size have many uses which will be recognized by those of skill in the art. Some examples of their utility are as follows. In one embodiment, a nanothin polymer film 16 with uniform pore size could encapsulate a catalyst. These capsules would have pore sizes which would allow the raw material and finished product to pass through the pores. The raw material would enter the capsule and the reaction would occur inside the capsule. The finished product would then exit the capsule through the pores. The encapsulated catalyst would be much easier to remove from the finished product than a if it was added to the raw material without being enclosed in a nanothin polymer film 16. In a second embodiment, a nanothin polymer film 16 would be attached to a Teflon film to serve as a size selective membrane in a dialysis operation. The specific pore sizes would reduce the amount of time to pass the desired fluid through the membrane.

This patent application expressly incorporates by reference all patents, references, and publications disclosed herein.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

EXAMPLES

1. Formation of Nanothin Polymer Bilayer

Method A:

A solution of phospholipids (typically, 20 mg of dilauroyl phosphatidyl choline (DLPC) or dipalmitoyl phosphatidyl choline (DPPC)) in 1 mL of chloroform was placed in a culture tube and the chloroform was removed with the help of a gentle stream of dry and deoxygenated argon. In the experiments where pore forming templates were used, a solution of the pore forming template (glucose pentaacetate or glucose pentabenzoate) in chloroform (0.1 mL, 0.1 mg/mL) was mixed with the solution of the phospholipids before drying. The traces of solvent were removed by drying the culture tube in vacuum ($10^{-3}$ Torr) for one hour. This step creates a dry film of phospholipids.

This film was hydrated with 1 mL of aqueous solution containing three dyes: methyl orange, Procion Red, and Reactive Blue2/β-cyclodextrin conjugate. Concentrations of dyes in the aqueous solution were in the range of 0.1-10 mM. The pH of the solution was adjusted to 7 after dyes were dissolved. The hydration step was carried out by gentle shaking of the culture tube until lipid film disappeared and the solution became turbid, typically, 15 min.

The solution was then extruded multiple times (typically, 21 times) through a polycarbonate Nuclepore™ filter containing cylindrical pores of 100 nm. The extruder was purchased from Avanti Polar Lipids, Inc. The extruded solution containing unilamellar liposomes of uniform size was separated from the unentrapped dyes on a size exclusion column. Typically, a Sepharose 4B column (length 20 cm, internal diameter 1 cm) was used to separate 1 mL of liposome solution. The liposome fraction, easily identifiable due to its turbidity, was collected. Monomers and crosslinkers were added to the solution, and the solution was stirred for 4 hours to allow them to diffuse into the bilayers. In a typical experiment, 1:1 molar ratio of styrene (2.6 mg) and divinylbenzene (3.3 mg) was used. To initiate the polymerization, the solution was irradiated with ultraviolet light in a Rayonet™ photochemical cabinet (2 lamps, $\lambda=256$ nm) for 1-4 hours.

Method B.

Alternatively, monomers and crosslinkers were loaded into the bilayers before the extrusion step. In this method, lipid film with or without pore forming templates was created as described in Method A and dried in vacuum. Monomers and crosslinkers were added to the dry lipid film, and the mixture was hydrated with the aqueous solution of dyes as described in Method A. The turbid solution was extruded as described above, and the polymerization was initiated. The size exclusion chromatography was performed after the polymerization.

2. Removal of Pore Forming Material

The polymerization created a lipid bilayer with an interior, nanothin, hydrophobic, polymer film with pore forming templates dispersed throughout. After the polymerization, the reaction mixture was treated with equivalent volume of aqueous Triton X-100 (2%) solution. The lipid bilayer and pore forming templates dissolved in the solution, but the hydrophobic polymer film did not dissolve. To ensure complete removal of pore forming templates, 0.1 mL of aqueous sodium hydroxide solution (0.1M) was added, and the mixture was allowed to stand at ambient temperature for 0.5 hour. The pH of the solution was then adjusted to 7 with hydrochloric acid (0.1M).

3. Retention of Specifically Sized Materials by Porous Nanocapsules

After treatment with detergent and sodium hydroxide as described above, the solution of nanocapsules was separated from released dyes on a size exclusion column. The reaction mixture (0.5 mL) was deposited on a Sepharose 4B column (length 20 cm, internal diameter 1 cm) and was eluted with deionized water. The fraction immediately following the column void volume was collected. The fraction was slightly turbid as expected due to light scattering from nanocapsules. Released dyes were well separated on the size exclusion column as evidenced by the colorless band between fractions containing nanocapsules and free dyes. The nanocapsule fraction was examined visually to provide a quick measure of dye retention. In addition, the amounts of retained dyes were determined quantitatively by UV/vis spectroscopy.

What is claimed is:

1. A method of producing a polymer film with pores, comprising:
   providing a lipid;
   providing a pore forming template;
   dissolving the lipid and the pore forming template into a first solution;
   drying the first solution in order to create a lipid film with the pore forming templates dispersed throughout;
   hydrating the lipid film in order to create a second solution;
   extruding the second solution to form a unilamellar, uniform lipid film;
   providing a monomer in an effective amount so that a pore forming template spans a thickness of a formed polymer film in a lipid bilayer of the lipid film;
   providing a crosslinker;
   adding the monomer and the crosslinker to the extruded second solution;
   polymerizing the second solution in order to form the lipid bilayer with an interior, hydrophobic, polymer film with the pore forming templates dispersed throughout, wherein the polymer film has a thickness so that the pore forming template spans the thickness of the polymer film;
   dissolving the pore forming templates into a third solution by addition of a solvent; and
   removing the third solution by separation in order to leave a polymer film with pores of a uniform thickness and surface area.

2. The method of claim 1, wherein the pore forming template is an inert molecule that is chemically degradable and hydrophobic.

3. The method of claim 2, wherein the pore forming template is glucose pentaacetate.

4. The method of claim 2, wherein the pore forming template is glucose pentabenzoate.

5. The method of claim 2, wherein the extruding step is repeated at least 10 times.

6. The method of claim 5, wherein the monomer is styrene.

7. The method of claim 5, wherein the cross linker is divinylbenzene.

8. The method of claim 7, wherein the solvent is a detergent solution.

9. The method of claim 5, wherein dissolving the pore forming templates into a third solution by addition of a solvent further comprises:

adding a detergent solution;
adding an aqueous sodium hydroxide solution;
incubating for 0.5 hours; and
adjusting pH to 7 with hydrochloric acid.

10. A method of producing a polymer film with pores, comprising:
- providing a lipid;
- providing a pore forming template;
- dissolving the lipid and the pore forming template into a first solution;
- drying the first solution in order to create a lipid film with the pore forming templates dispersed throughout;
- providing a monomer in an effective amount so that a pore forming template spans a thickness of a formed polymer film in a lipid bilayer of the lipid film;
- providing a crosslinker;
- adding the monomer and the crosslinker to the lipid film;
- hydrating the lipid film in order to create a second solution;
- extruding the second solution to form a unilamellar, uniform lipid film;
- polymerizing the second solution in order to form the lipid bilayer with an interior, hydrophobic, polymer film with the pore forming templates dispersed throughout, wherein the polymer film has a thickness so that the pore forming template spans the thickness of the polymer film;
- dissolving the pore forming templates into a third solution by addition of a solvent; and
- removing the third solution by separation in order to leave a polymer film with pores of a uniform thickness and surface area.

* * * * *